(12) United States Patent
Stickle et al.

(10) Patent No.: US 9,553,787 B1
(45) Date of Patent: Jan. 24, 2017

(54) MONITORING HOSTED SERVICE USAGE

(71) Applicant: Amazon Technologies, Inc., Reno, NV (US)

(72) Inventors: Thomas Charles Stickle, Saint James, NY (US); David Samuel Zipkin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 13/873,009

(22) Filed: Apr. 29, 2013

(51) Int. Cl.
*H04L 12/26* (2006.01)

(52) U.S. Cl.
CPC .................................... *H04L 43/10* (2013.01)

(58) Field of Classification Search
CPC ...................................................... H04L 43/10
USPC ...................................................... 709/224
See application file for complete search history.

(56) References Cited

U.S. PATENT DOCUMENTS

| | | |
|---|---|---|
| 4,788,637 A | 11/1988 | Tamaru |
| 5,757,908 A | 5/1998 | Cooper et al. |
| 5,870,717 A | 2/1999 | Wiecha |
| 6,664,981 B2 | 12/2003 | Ashe et al. |
| 6,735,768 B1 | 5/2004 | Tanaka |
| 6,910,071 B2 | 6/2005 | Quintero et al. |
| 7,133,846 B1 | 11/2006 | Ginter et al. |
| 7,165,041 B1 | 1/2007 | Guheen et al. |
| 7,277,572 B2 | 10/2007 | Macinnes et al. |
| 7,315,830 B1 | 1/2008 | Wirtz et al. |
| 7,324,969 B2 | 1/2008 | Pallister et al. |
| 7,415,617 B2 | 8/2008 | Ginter et al. |
| 7,433,835 B2 | 10/2008 | Frederick et al. |
| 7,466,835 B2 | 12/2008 | Stenberg et al. |
| 7,467,206 B2 | 12/2008 | Moore et al. |
| 7,729,954 B2 | 6/2010 | Frederick et al. |

(Continued)

FOREIGN PATENT DOCUMENTS

| | | |
|---|---|---|
| CA | 2554462 | 8/2005 |
| CN | 103959317 A | 7/2014 |

(Continued)

OTHER PUBLICATIONS

Wikipedia, Open Virtualization Format, Apr. 5, 2015, Wlkipedia, 4 pages.*

(Continued)

*Primary Examiner* — Wing F Chan
*Assistant Examiner* — Leon Y Tseng
(74) *Attorney, Agent, or Firm* — Knobbe Martens Olson & Bear LLP

(57) ABSTRACT

Systems and methods are disclosed which facilitate monitoring of usage information associated with services implemented within a hosted computing environment. Providers of a service, or other authorized parties, may be enabled to associate one or more descriptors with a service. Thereafter, each service instances may be monitored for such descriptors. By correlating usage information of instances with specific descriptors, usage information for the descriptor may be generated. In some instances, usage information corresponding to a descriptor may be utilized to monitor license agreements associated with services including the descriptor. Further, use of descriptors may reduce or eliminate the need to associate services with physical attributes of hosting computing devices, such as media access control addresses.

25 Claims, 7 Drawing Sheets

(56) References Cited

U.S. PATENT DOCUMENTS

| | | |
|---|---|---|
| 7,729,955 B2 | 6/2010 | Frederick et al. |
| 7,778,874 B1 | 8/2010 | Saunders |
| 7,797,198 B1 | 9/2010 | Frederick et al. |
| 7,797,271 B1 | 9/2010 | Bonneau et al. |
| 7,801,771 B1 | 9/2010 | Sirota et al. |
| 7,908,358 B1 | 3/2011 | Prasad et al. |
| 7,953,642 B2 | 5/2011 | Dierks |
| 7,958,529 B2 | 6/2011 | Green et al. |
| 8,005,723 B1 | 8/2011 | Sirota et al. |
| 8,019,652 B1 | 9/2011 | Frederick et al. |
| 8,019,653 B1 | 9/2011 | Frederick et al. |
| 8,019,660 B2 | 9/2011 | Westphal |
| 8,024,225 B1 | 9/2011 | Sirota et al. |
| 8,185,220 B2 | 5/2012 | Lloyd |
| 8,270,310 B2 | 9/2012 | Raleigh |
| 8,442,234 B2 | 5/2013 | Brown et al. |
| 2002/0007304 A1 | 1/2002 | Kasajima et al. |
| 2002/0083003 A1 | 6/2002 | Halliday et al. |
| 2002/0120461 A1 | 8/2002 | Kirkconnell-Ewing et al. |
| 2002/0120519 A1 | 8/2002 | Martin et al. |
| 2003/0195813 A1 | 10/2003 | Pallister et al. |
| 2003/0217357 A1 | 11/2003 | Parry |
| 2004/0054923 A1 | 3/2004 | Seago et al. |
| 2004/0122926 A1 | 6/2004 | Moore et al. |
| 2004/0243583 A1 | 12/2004 | Olsen |
| 2005/0010916 A1 | 1/2005 | Hagen et al. |
| 2005/0039034 A1 | 2/2005 | Doyle et al. |
| 2005/0203801 A1 | 9/2005 | Morgenstern et al. |
| 2005/0256882 A1 | 11/2005 | Able et al. |
| 2006/0041591 A1 | 2/2006 | Rhoads |
| 2006/0053079 A1 | 3/2006 | Edmonson et al. |
| 2007/0022447 A1 | 1/2007 | Arseneau et al. |
| 2007/0067297 A1 | 3/2007 | Kublickis |
| 2007/0130156 A1 | 6/2007 | Tenhunen et al. |
| 2007/0233540 A1 | 10/2007 | Sirota |
| 2007/0260612 A1 | 11/2007 | Papakonstantinou et al. |
| 2007/0292012 A1 | 12/2007 | Brandon et al. |
| 2008/0077532 A1 | 3/2008 | Von Heesen et al. |
| 2008/0080396 A1 | 4/2008 | Meijer et al. |
| 2008/0098462 A1 | 4/2008 | Carter |
| 2008/0103975 A1 | 5/2008 | Taratino et al. |
| 2009/0037337 A1 | 2/2009 | Baitalmal et al. |
| 2009/0037492 A1 | 2/2009 | Baitalmal et al. |
| 2009/0052330 A1 | 2/2009 | Matsunaga et al. |
| 2009/0094147 A1 | 4/2009 | Fein et al. |
| 2009/0119779 A1 | 5/2009 | Dean et al. |
| 2009/0138380 A1 | 5/2009 | Roseman et al. |
| 2009/0182928 A1* | 7/2009 | Becker ............... G06F 9/45558 711/6 |
| 2009/0237404 A1 | 9/2009 | Cannon, III |
| 2009/0241037 A1 | 9/2009 | Hyndman |
| 2009/0288082 A1 | 11/2009 | Nazeer et al. |
| 2009/0300607 A1* | 12/2009 | Ferris ............... G06F 9/45558 718/1 |
| 2010/0114739 A1 | 5/2010 | Johnston |
| 2010/0250730 A1* | 9/2010 | Menzies et al. ............... 709/224 |
| 2010/0262508 A1 | 10/2010 | Volnak |
| 2011/0119191 A1* | 5/2011 | Stern et al. ............... 705/59 |
| 2011/0126110 A1 | 5/2011 | Vilke et al. |
| 2011/0126197 A1 | 5/2011 | Larsen et al. |
| 2011/0161172 A1 | 6/2011 | Lee |
| 2011/0173028 A1 | 7/2011 | Bond |
| 2011/0214124 A1 | 9/2011 | Ferris et al. |
| 2011/0258634 A1* | 10/2011 | Bonilla et al. ............... 718/105 |
| 2011/0299424 A1 | 12/2011 | Rikitake et al. |
| 2012/0101952 A1 | 4/2012 | Raleigh et al. |
| 2012/0260312 A1* | 10/2012 | Backman ............... H04L 63/12 726/3 |
| 2012/0266170 A1* | 10/2012 | Zimmerman et al. ............... 718/1 |
| 2012/0278229 A1 | 11/2012 | Vishwanathan et al. |
| 2012/0278439 A1 | 11/2012 | Ahiska et al. |
| 2013/0054336 A1 | 2/2013 | Graylin |
| 2013/0085892 A1 | 4/2013 | Golden et al. |
| 2013/0085899 A1 | 4/2013 | Tyra et al. |
| 2013/0124606 A1* | 5/2013 | Carpenter ............... H04L 67/06 709/203 |
| 2013/0262640 A1 | 10/2013 | Monroe |
| 2013/0268437 A1 | 10/2013 | Desai et al. |
| 2013/0305322 A1 | 11/2013 | Raleigh et al. |
| 2014/0032764 A1* | 1/2014 | Akolkar et al. ............... 709/226 |
| 2014/0109046 A1 | 4/2014 | Hirsch et al. |
| 2014/0181306 A1* | 6/2014 | Kothamasu et al. ......... 709/226 |
| 2014/0181984 A1* | 6/2014 | Kundu ............... G06F 17/30129 726/26 |

FOREIGN PATENT DOCUMENTS

| | | |
|---|---|---|
| CN | 104115177 A | 10/2014 |
| EP | 2761555 A | 8/2014 |
| EP | 2761558 A | 8/2014 |
| GB | 2426362 | 11/2006 |
| JP | 2003-44602 | 2/2003 |
| JP | 2007-149096 A | 6/2007 |
| JP | 2010-277187 A | 12/2010 |
| JP | 4743726 B1 | 8/2011 |
| WO | WO 2005/072342 A2 | 8/2005 |
| WO | WO 2013/049393 | 4/2013 |
| WO | WO 2013/049395 | 4/2013 |

OTHER PUBLICATIONS

Hess, OVF to VM and Back Again, Jun. 23, 2009, Linux Magazine, 2 pages.*
Melber, Controlling Privileges of the Administrator Accounts, Jan. 30, 2007, WindowSecurity.com, 4 pages.*
Moran and Levinger, Oracle® Security Overview, Dec. 2003, Oracle®, 174 pages.*
International Search Report and Written Opinion in PCT/US2012/057624 mailed Dec. 6, 2012.
Doumae,"Cloud in Japan—II Probation into Ability of GIO" (excerpt); Chapter 1—Cloud in Japan and IIJ GIO; G-Cloud Magazine; Japan; K.K., Gijutsu Hyoronsha; Sep. 10, 2010; pp. 100-101.
Nakata, Atsushi, Close up, Nikkei computer, No. 789, Nikkei Business Publications, Inc., Aug. 18, 2011, p. 68-75.
Shimizu, Masato, Amazon EC2/S3/EBS, Virtual server construction by cloud computing, 1st edition, Socym Co., Ltd., Shoichiro Takeda, Aug. 27, 2009, p. 128-138.
Taniguchi; "Cloud in Japan—II Probation into Ability of GIO"; Chapter 2—Using IIJ Cloud: Its simple! Establishing the web server by using the GIO hosting package; G-Cloud Magazine; Japan; K.K. Gijutsu Hyoronsha; Sep. 10, 2010; pp. 102-109.
Taniguchi; "Cloud in Japan—II Probation into Ability of GIO"; Chapter 3—Full-scale! Example of Structuring using GIO Component Service—Encouraging Full-Scale Cloud Infrastructure with Parts Selected and Used; G-Cloud Magazine; Japan; K.K. Gijutsu Hyoronsha; Sep. 10, 2010; pp. 110-117.
Office Action in Japanese Application No. 2014-533330 dated Mar. 2, 2015.
Office Action in Singapore Application No. 2014012645 dated Mar. 27, 2015.
Office Action in Japanese Application No. 2014-533331 dated Feb. 23, 2015.
Supplementary Search Report in European Application No. 12834770.5 dated Apr. 10, 2015.
U.S. Appl. No. 13/249,143, Enterprise Software Marketplace, filed Sep. 29, 2011.
U.S. Appl. No. 13/249,054, Customizable Uniform Control User Interface for Hosted Service Images, filed Sep. 29, 2011.
U.S. Appl. No. 13/249,063, Managing Usage Consitions of Hosted Service Images, filed Sep. 29, 2011.
U.S. Appl. No. 13/248,227, Electronic Marketplace for Hosted Service Images, filed Sep. 29, 2011.
U.S. Appl. No. 13/326,840, Providing Trial Use of Hosted Service Images, filed Dec. 15, 2011.
U.S. Appl. No. 13/326,854, Providing Trial Use of Hosted Service Images, filed Dec. 15, 2011.
Supplementary Search Report in European Application No. 12835825.6 dated Jul. 14, 2015.

(56) References Cited

OTHER PUBLICATIONS

Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.

Nakata, Atsushi, Close up, Nikkei computer, No. 789, Nikkei Business Publications, Inc., Aug. 18, 2011, pp. 68-75.Nakata, A., Close up, Nikkei computer, No. 789, Nikkei Business Publications, Inc., Aug. 18, 2011, pp. 68-75.

Shimizu, M., EC2/S3/EBS, Virtual Server Construction by Cloud Computing, 1st ed., Socym Co., Ltd., Shoichiro Takeda, Aug. 27, 2009, pp. 128-138.

Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102 109.

Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110-117.

International Preliminary Report on Patentability received in PCT/US2012/057624 dated Apr. 1, 2014.

Supplementary Search Report received in European Application No. 12834770.5 dated Apr. 10, 2015.

Office Action received in Japanese Application No. 2014-533330 dated Mar. 2, 2015.

Office Action received in Australian Application No. 2012315939 dated Mar. 10, 2015.

Office Action received in Singapore Application No. 2014012645 dated Mar. 27, 2015.

Office Action received in Canadian Application No. 2850008 dated May 19, 2015.

Office Action received in Australian Application No. 2012315941 dated Mar. 10, 2015.

Office Action received in Japanese Application No. 2014-533331 dated Feb. 23, 2015.

Notification of Grant received in Singapore Application No. 2014012645 dated Feb. 26, 2016.

Office Action received in Australian Application No. 2012315939 dated May 19, 2015.

Office Action received in Chinese Application No. 201280047426.1 dated Apr. 29, 2016.

Office Action received in Canadian Application No. 2,850,011 dated Sep. 1, 2015.

Office Action received in Japanese Application No. 2014-533331 dated Sep. 3, 2015.

Office Action received in Russian Application No. 2014117208 dated Nov. 30, 2015.

Ebay, Inc.; Ebay Advertising Targeting homepage, downloaded on Feb. 17, 2012 from http://www.ebayadvertising.com/en/display-ads-targeting.

Ranganathan et al., Advertising in a Pervasive Computing Environment, University of Illinois, 5 pages, Urbana, IL.

International Search Report and Written Opinion in PCT/US2012/057626 mailed Dec. 24, 2012.

Office Action in Australian Application No. 2012315939, dated Mar. 10, 2015.

Office Action in Australian Application No. 2012315941, dated Mar. 10, 2015.

* cited by examiner

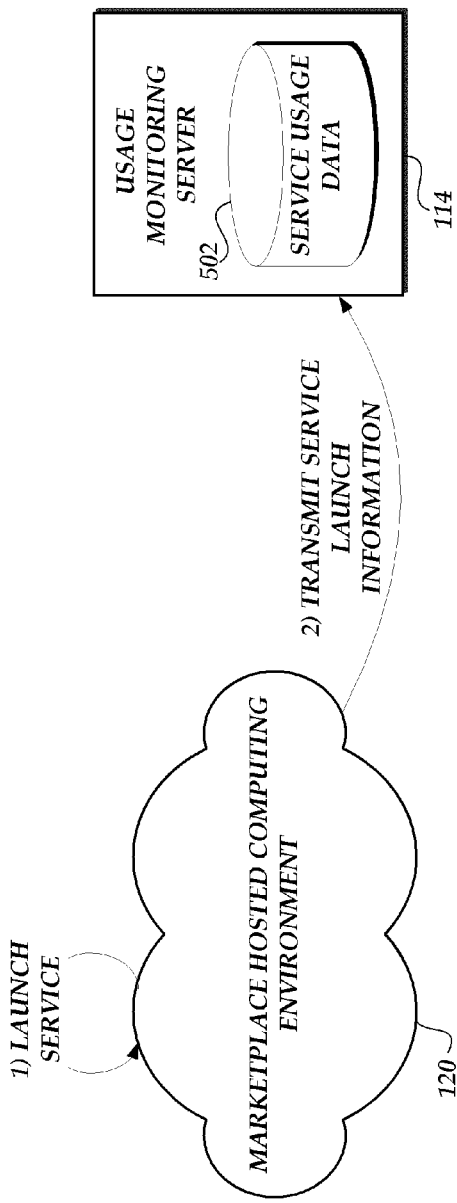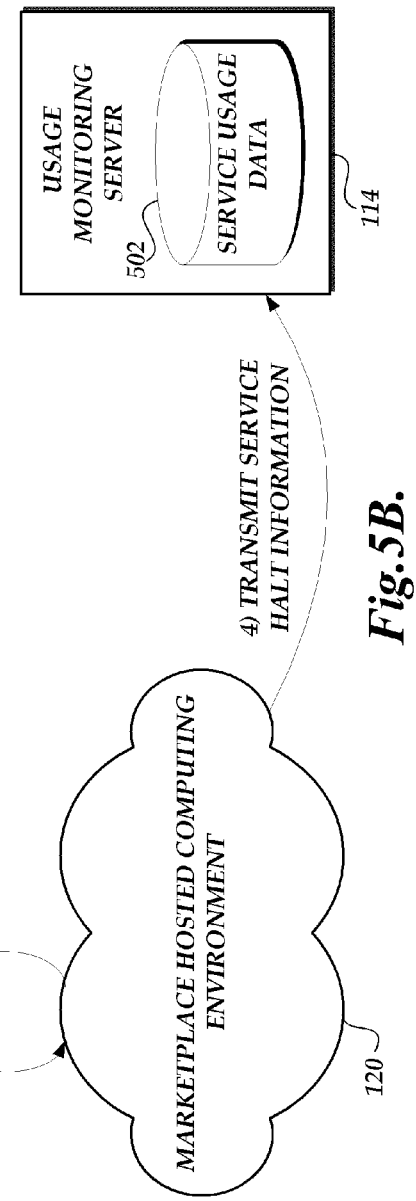
Fig.5A.
Fig.5B.

MONITORING HOSTED SERVICE USAGE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing the applications and computing resources available from a data center for specific purposes.

Generally, a license may be required in order to implement a service image or services included within a service image. These licenses may include various terms of use. In some instances, licenses may be for a fixed term (e.g., 1 year). In other instances, licenses may require a fee for use during a time period (e.g., 1 dollar per hour of use). Licenses may contain additional or alternative terms. Further, licenses may include combinations of any such terms.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, where:

FIGS. 5A and 5B are schematic block diagrams depicting the monitoring of service usage information by usage monitoring server associated with the services marketplace of FIG. 1;

DETAILED DESCRIPTION

Figure 1:
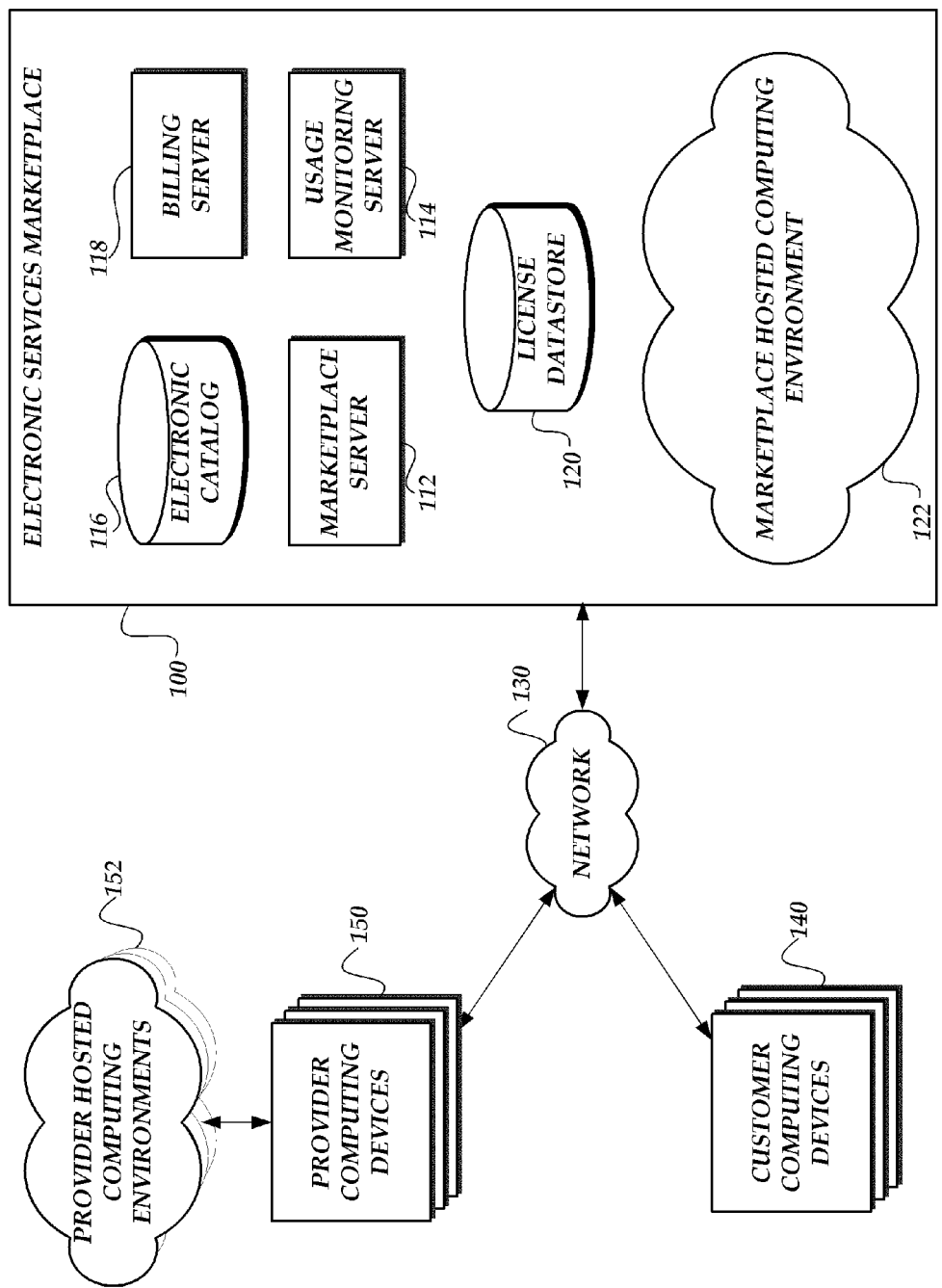
FIG. 1 is a schematic block diagram depicting an illustrative operating environment in which an electronic services marketplace enables customers to browse descriptions of services, and acquire licenses to services made available in the marketplace.

Generally described, aspects of the present disclosure relate to monitoring usage of hosted services within rapidly provisioned and released hosted computing environments, which may also be referred to as "cloud" computing environments. Monitoring of services may be used, for example, to enforce licensing agreements associated with services, or to generate usage data indicative of use of the service. Specifically, each service may be associated with one or more unique descriptors. Each descriptor may be assigned to the service by a provider of the service, or by a party authorized by the provider. Thereafter, the descriptor may be permanently or semi-permanently associated with the service, such that any execution or implementation of the service may be linked to the descriptor. As will be described in more detail below, any implementation of the service may therefore be associated with the descriptor. Therefore, by polling or recording information associated with the descriptor, usage information corresponding to the service may be easily retrieved. For example, assume a license specifies a maximum number of simultaneous executions of a service. Further assume that the service is associated with a unique descriptor. In order to ensure compliance with the license, a hosted computing environment may monitor the number of running services associated with the descriptor. If the number does not exceed the maximum specified within the license, the license is complied with. Further examples of utilization of unique descriptors to generate usage information corresponding to a service will be described in more detail below.

In one embodiment, an electronic services marketplace may be provided that permits users to browse descriptions of services, such as service images implementing desired functionalities or services. Services may be submitted to, and made available from, the electronic services marketplace by third party providers or may be submitted to the marketplace by the operator of the marketplace itself. A customer may purchase licenses to implement services (e.g., within images containing executable code for providing the services) via a hosted computing environment. Once a corresponding license has been acquired through the electronic services marketplace, a service may be launched on a hosted computing environment maintained by a third party or on a hosted computing environment associated with the marketplace. As discussed in greater detail below, embodiments of the electronic services marketplace may provide one or more unique descriptors for a given service, such that utilization of the service may be tracked based on the unique descriptors. For example, an operator the electronic services marketplace may monitor unique descriptors of each service implemented within a hosted computing environment in order to ensure the services are in compliance with licensing agreements. As a further example, the electronic services marketplace may generate usage data indicative of use of each unique descriptor, and provide such usage data to a provider of a corresponding service or an operator of the electronic services marketplace. Usage data may indicate, for example, the number of customers implementing a service or details regarding implementation, such as location, timing, or duration of implementation of the service.

Specifically, providers of services may be enabled to associate a service (or a service image containing executable code for providing the service) with a unique descriptor (which may also be referred to herein as a "tag"). The electronic services marketplace may require authentication in prior to some interactions with descriptors, such that only authorized parties (e.g., a provider) are enabled to modify or generate descriptors associated with a given service. Thereafter, the unique descriptor may be permanently or semi-permanently associated with the service, such that any implementation of the service is indicated by existence of the unique tag. In one embodiment, where a service is contained within a set of executable instructions that may be provisioned to a computing device (e.g., a service image), a unique descriptor may also be included within the service image. Thus, even where multiple copies of a service image are generated from a single initial image, the unique descriptor may propagate throughout each service image copy. In another embodiment, computer-executable instructions associated with individual instances of a service (e.g., a virtual data storage device corresponding to the instance) may be modified to include a descriptor. In this manner, each execution of the instance may include the descriptor, regardless of the specific computing device which executes the instance. Association of descriptors to computer-executable instructions associated with individual instances may be especially beneficial in cases where services are not implemented within service images. In still more embodiments, unique descriptors may be associated with services without requiring modification of computer-executable instructions associated with service images or service instances. For example, the electronic service marketplace may maintain a database of associations between descriptors and computer-executable instructions associated with a service image and/or instances of a service. Such an association may be maintained, for example, based on an identifier of each set of computer-executable instructions. Illustratively, identifiers of sets of computer-executable instructions may include a location of the computer-executable instructions within a storage device (virtual or physical), an identifier of a virtual data store corresponding to a set of computer-executable instructions (e.g., a volume ID), etc. As will be described in more detail below, by associating descriptors with sets of computer executable instructions associated with a service image and/or a service instance, such associations may be maintained regardless of execution of the computer executable instructions. For example, associations between a service instance and a descriptor may persist regardless of whether the service instance is started, restarted, or stopped, and regardless of the physical computing device implementing the service instance.

Though generally reference may be made herein to service images, services available via the electronic services marketplace may, in some embodiments, be implemented without use of a service image. For example, the electronic services marketplace may include services providing access to applications or data sets, either of which may or may not be associated with a service image. In addition, the electronic services marketplace may provide access to either partially or wholly human-provided services. Illustratively, such human-provided services may correspond to customer services or to technical support services. As such, though reference to service images may be made below, the current disclosure should not be limited to facilitating transfer of licenses related to service images, but may encompass facilitating transfer of licenses related to any service available from and provided by an electronic services marketplace.

Embodiments discussed below may refer to the users of an electronic services marketplace for service images as customers. However, it may be understood that users are not limited to customers but may include owners, administrators, end users, and providers of service images purchased from the electronic services marketplace.

Embodiments of an electronic services marketplace which may offer service images for acquisition may be found in U.S. patent application Ser. No. 13/248,227, filed on Sep. 29, 2011, and entitled, "ELECTRONIC SERVICES MARKETPLACE FOR HOSTED SERVICE IMAGES," the entirety of which is hereby incorporated by reference (the "'227 Application"). In brief, the electronic services marketplace may provide an environment with which both providers and customers of service images can interact via a network. In one embodiment, a provider may submit a service image to the electronic services marketplace for inclusion in an electronic catalog. The provider may submit additional information corresponding to the service image that would be useful to a customer, such as pricing information, usage conditions, a location of a provider hosted computing environment on which the service image can be hosted, or other information.

Customers may employ a user computing device to browse the electronic catalog by interaction with various user interfaces generated by the electronic services marketplace, described in greater detail below. On identifying a service of interest, the customer may view details of each service in the electronic catalog, such as the information submitted by the provider of the service. In some embodiments, a customer may view further information associated with a service, such as usage statistics by other marketplace customers of the service, reviews by other customers, or recommendations for similar or complementary services. Further, in some embodiments, customers may be enabled to view descriptors associated with a service. In other embodiments, such descriptors may not be displayed to customers. Accordingly, services may be surfaced to customers in a variety of ways by the services marketplace, such as by navigation through a browse tree of services organized by function, type, size, etc. or through recommendations, reviews, etc.

Once a customer selects a service, the customer may purchase or otherwise acquire the service from the services marketplace. In some embodiments, the customer may be required to submit payment information for the service prior to launch of the service. After acquisition of the service by the customer, the service may be launched and executed by one or more hosted computing environments. The hosted computing environment may be provided by an operator of the services marketplace or may be otherwise associated with the services marketplace. In some embodiments, the third party provider of the acquired service may provide a hosted computing environment for the service acquired by the customer via the services marketplace.

During or subsequent to launching of a service, the electronic services marketplace may monitor usage of the service to ensure the service is in compliance with any applicable licensing agreements. In traditional computing environments, monitoring may be accomplished in part by monitoring an identifying characteristic of a physical computing device implementing a service. For example, when a database service is installed on a computing device within a traditional environment, a media access control (MAC) address of the computing device may be recorded and associated with a license to the database. Thereafter, any implementation of the database service by the device corresponding to the recorded MAC address may be determined to comply with the license. However, implementation of the database service on a device not corresponding to the recorded MAC address may be determined to not be in compliance with the license. Accordingly, the number of computing devices enabled to execute the database service would be directly proportional to the number of licenses granted.

However, in environments where services are provided via rapidly provisioned and released computing resources (e.g., virtual machine instances) within a hosted computing environment (e.g., a "cloud" computing environment), association of licenses to identifying characteristics of a physical computing device may not be feasible or desirable. For example, assume that a database service is associated with a machine image that may be provisioned to a computing device. Further assume that the database service is used infrequently, and that the machine image is provisioned to a computing device only during those periods when access to the service is desired. Because of the infrequency of use and dynamic allocation of computing devices to implement the machine image, the underlying physical computing device that implements the machine image may alter with each implementation. Accordingly, while the current example only contemplates execution of a single database service, multiple computing devices (and therefore MAC addresses) may be associated with the database service. In a traditional environment, licenses may therefore be required for each MAC address that executed the service's machine image. The ability of the image to be rapidly provisioned to any available computing device would therefore be limited, and the cost associated with rapidly provisioning the image would be increased.

In order to address such issues, a service may be associated within a hosted computing environment (or marketplace offering the service for acquisition) with a unique descriptor. Thereafter, each time the service is implemented within a hosting computing device (e.g., each time an "instance" of the service is created), the descriptor may be monitored to determine a total number of implementations of the service. In one embodiment, a service may be configured such that each time the service is instantiated or destantiated, an indication of such the instantiation/destantiation is delivered to a usage monitoring device. In other embodiments, a usage monitoring device may be configured to periodically monitor service instances, and maintain a record of descriptors associated with the services.

Thereafter, users of the hosted computing environment may submit queries regarding a descriptor, and receive further information about the use of services associated with the descriptor. For example, a provider of a service may request a license audit of a service associated with a descriptor. An electronic services marketplace and/or hosted computing environment may thereafter determine the number of instances associated with the descriptor, and return and indication of license compliance to the provider. As a further example, an administrator of the electronic services marketplace may submit a query for geographic information associated with a descriptor, and be provided with an indication of the number of instances associated with the descriptor executing in any desired geographic region. Further examples of usage information generated based on unique descriptors will be discussed in more detail below.

With reference to FIG. 1, an illustrative operating environment is shown which includes an electronic services marketplace 100 that enables customers to browse descriptions of services available from the electronic services marketplace 100. The electronic services marketplace 100 may further enable customers to acquire licenses corresponding to services made available in the electronic services marketplace 100 by third party providers or the operator of the electronic services marketplace 100. Services corresponding to acquired licenses may be implemented within a hosted computing environment, as discussed in greater detail below.

As illustrated in FIG. 1, the operating environment includes one or more provider computing devices 150 and one or more customer computing devices 140 in communication with an electronic services marketplace 100 via a network 130. A third party provider, using a provider computing device 150, may submit via the network 130 a service or service image implementing a service to the electronic services marketplace 100. The third party provider may additionally submit other information associated with use or acquisition of the service on the electronic services marketplace 100, such as unique descriptors to be attached to the service, or licensing information of the service. The electronic services marketplace 100 may make the submitted service, as well as other services or service images implementing services, available to customers.

Accordingly, a customer, using his or her customer computing device 140, may communicate with the electronic services marketplace 100 regarding services made available by the electronic services marketplace 100. In one embodiment a customer may communicate with the electronic services marketplace 100 in order to browse descriptions of services made available by the electronic services marketplace 100, including the availability of licenses corresponding with the service and any terms of such licenses. In another embodiment, a customer may communicate with the electronic services marketplace 100 in order to acquire a license for a desired service. In a further embodiment, a customer may communicate with the electronic services marketplace 100 in order to launch a service corresponding to the acquired license. Launching of a service may occur within a marketplace hosted computing environment 122 operated, maintained, provided or otherwise associated with the operator of the electronic services marketplace 100. In alternative embodiments, where an acquired service was submitted to the electronic services marketplace 100 by a third party provider, the acquired service may be launched in a provider hosted computing environment 152 that is operated, maintained, provided or otherwise associated with the third party provider.

A hosted computing environment (e.g., marketplace hosted computing environment 122 or provider hosted computing environment 152) may include a collection of rapidly provisioned and released computing resources hosted in connection with the marketplace or a third party provider. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586 entitled "Configuring Communications Between Computing Nodes" and issued Jan. 4, 2011, which is hereby incorporated by reference in its entirety. A hosted computing environment may also be referred to as a cloud computing environment.

Though described herein with reference to hosted computing environments associated with a provider of a service and with the electronic services marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic services marketplace 100, and may be utilized to host services available from the electronic services marketplace 100. For purposes of brevity, such additional hosted computing environments may also be referred to herein as "provider hosted computing environments."

The provider computing devices 150 and the customer computing devices 140 may communicate with the electronic services marketplace 100 via a network 130. The provider computing device 150 or customer computing device 140 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like.

Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

The electronic services marketplace 100 is illustrated in FIG. 1 as operating in a distributed computing environment comprising several computer systems that are interconnected using one or more networks. More specifically, the electronic services marketplace 100 may include a marketplace server 112, a usage monitoring server 114, an electronic catalog 116, a billing server 118, and a license datastore 120 discussed in greater detail below. However, it may be appreciated by those skilled in the art that the electronic services marketplace 100 may have fewer or greater components than are illustrated in FIG. 1. In addition, the electronic services marketplace 100 could include various Web services and/or peer-to-peer network configurations. Thus, the depiction of the electronic services marketplace 100 in FIG. 1 should be taken as illustrative and not limiting to the present disclosure.

Any one or more of the marketplace server 112, the usage monitoring server 114, the electronic catalog 116, the billing server 118, and the license datastore 120 may be embodied in a plurality of components, each executing an instance of the respective marketplace server 112, usage monitoring server 114, electronic catalog 116, billing server 118, and license datastore 120. A server or other computing component implementing any one of the marketplace server 112, the usage monitoring server 114, the electronic catalog 116, the billing server 118, and the license datastore 120 may include a network interface, memory, processing unit, and computer readable medium drive, all of which may communicate which each other may way of a communication bus. The network interface may provide connectivity over the network 130 and/or other networks or computer systems. The processing unit may communicate to and from memory containing program instructions that the processing unit executes in order to operate the respective marketplace server 112, usage monitoring server 114, electronic catalog 116, billing server 118, and license datastore 120. The memory may generally include RAM, ROM, other persistent and auxiliary memory, and/or any non-transitory computer-readable media.

With further reference to FIG. 1, illustrative components of the electronic services marketplace 100 will now be discussed. The marketplace server 112 may facilitate network submission by third party providers, and browsing and acquisition by customers, of services made available in the electronic services marketplace 100. Accordingly, a provider, utilizing a provider computing device 150, may submit one or more services (e.g., in the form of a service image) to the electronic services marketplace 100 via the marketplace server 112. The submitted services may then be included in an electronic catalog 116. The process by which a provider, utilizing a provider computing device 150, submits a service to the electronic services marketplace 100 is described in greater detail in the '227 Application.

A provider, utilizing a provider computing device 150, may further specify additional information corresponding to a submitted service. For example, a provider may specify licensing information associated with a service, such as required fees. Further, a provider may specify unique descriptors to be associated with a service (e.g., to facilitate monitoring and enforcement of licenses or to facilitate gathering and reporting of usage data).

The electronic catalog 116 may include information on services available from a plurality of providers and on services made available by the operator of the electronic services marketplace 100. Accordingly, the marketplace server 112 may obtain service information for services offered by a plurality of providers and the marketplace 100 and make information regarding the services available to a customer from a single network resource, such as a Web site. A customer may then acquire a license corresponding to a service from the electronic services marketplace 100 and launch the service in accordance with the license on a hosted computing environment (e.g., the marketplace hosted computing environment 122 or the provider hosted computing environment 152) in a single interaction or order placed with the electronic services marketplace 100. Beneficially, this eliminates the need for the customer to develop his or her own service; or research, search or otherwise investigate multiple different providers or other sources for the service.

Illustratively, marketplace server 112 may generate one or more user interfaces through which a customer, utilizing a customer computing device 140, may browse services made available by the electronic services marketplace 100, submit queries for matching services, view licensing information and details regarding specific services, acquire a license corresponding to a service, and implement the service on a hosted computing environment. An illustrative process by which a customer computing device 140 may query the electronic services marketplace 100, and by which the marketplace server 112 generates a user interface, is described in more detail in the '227 Application incorporated by reference above.

After the customer selects a desired service from the electronic services marketplace 100, the marketplace server 112 may facilitate the acquisition of a license corresponding to the service, as well as configuration the service. Information associated with a purchased license may be stored in a license datastore 120. Illustratively, the license datastore 120 may include, for each customer, information regarding licenses acquired by the customer. License information may correspond to, for example, time of acquisition of the license, terms of the license, the source of the license (e.g., from the service provider or from another customer), as well as additional or alternative license information.

The marketplace server 112 may further facilitate the launching of the service image on a hosted computing environment. In this regard, the marketplace server 112 may receive payment information from the customer computing device 140, as well as information specifying how the service should be implemented by a hosted computing environment. In some embodiments, the customer may select a specific hosted computing environment to host the selected service. The specific hosted computing environment may correspond, for example, to the marketplace hosted computing environment 122 associated with the electronic services marketplace 100, or to a provider hosted computing environment 152 which is associated with the provider of the service. Launching of services on a hosted computing environment may generally include implementing computer-executable instructions corresponding to the service within the hosted computing environment. In one illustrative embodiment, implementation of a service may include creation of a virtual data store within the hosted computing environment, provisioning of a copy of a service image corresponding to a desired service to the virtual data store, and execution of computer-executable instructions within the service image by a virtual computing device. Accordingly, the functionality corresponding by the service image may be provided via the virtual computing device. In another illustrative embodiment, implementation of a service may include modifying an already existing virtual data store to include computer-executable instructions corresponding to the service (e.g., by installing the service) and subsequent execution of such instructions by a virtual computing device. Additional embodiments may include any execution of computer-executable instructions corresponding to the service within the hosted computer environment.

Once an instance of the service is launched and running on a hosted computing environment, the electronic services marketplace 100 can monitor the usage of the service instance via the usage monitoring server 114. Specifically, the electronic services marketplace 100 can maintain records of descriptors associated with each service instance within a hosted computing environment. In one embodiment, the hosted computing environment and/or individual service instances may be configured to report instantiation or destantiation of a service instance to the usage monitoring server 114. In another embodiment, the usage monitoring server 114 may be configured to periodically request information of each service instance running on a hosted computing environment. The usage monitoring server 114 may further be configured to store information regarding each instance of a running service for later use (e.g., in generating usage information).

The electronic service marketplace 100 may further be configured to bill the customer/pay the provider based on usage information via the billing server 118. Specifically, the billing server 118 is provided to process payments from customers and, in some embodiments, provide payment to the providers of acquired services. The billing server 118 may receive and provide payment information via interaction with the marketplace server 112. In some embodiments, the billing server 118 may alternatively receive and provide payment information via other processes, such as via an additional server, via telephonic interaction, or other mechanisms. Moreover, the electronic services marketplace 100 may provide the customer with tools to manage, monitor, modify, etc. the service, service image implementing the service, or licenses corresponding to the service.

As described above, in some embodiments, the electronic services marketplace 100 may provide a variety of services, such as access to software applications, data sets, or either partially or wholly human-provided services. As will be appreciated by one skilled in the art, the illustrative components of FIG. 1 may enable the electronic service marketplace 100 to provide any one or more of these services.

Figure 2:
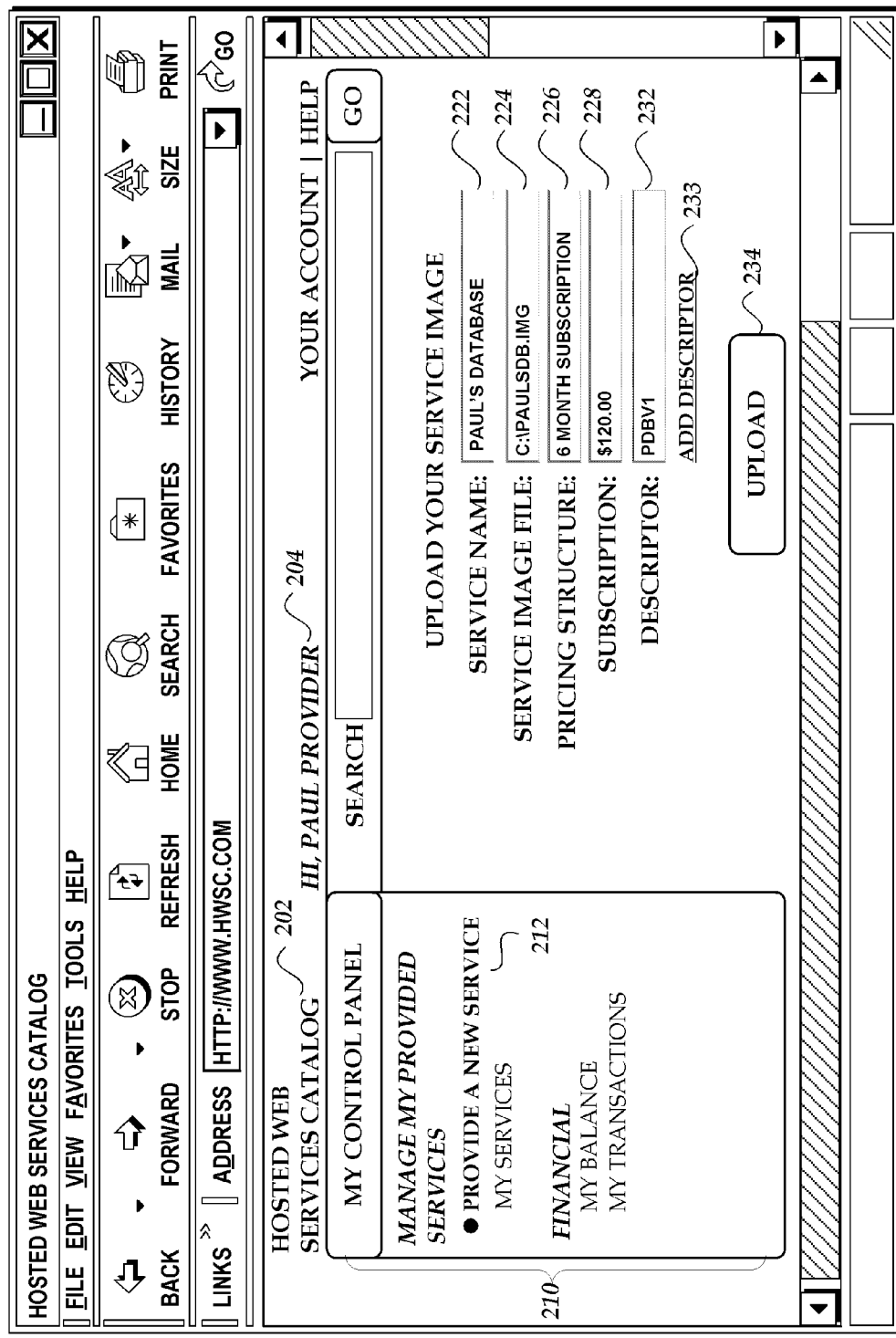
FIG. 2 depicts an illustrative user interface displayed on a provider computing device that enables a provider to submit a service for inclusion in the services marketplace of FIG. 1.

With reference to FIG. 2, one example of a user interface 200 for provider submission of a service is displayed. As shown in FIG. 2, the user interface 200 enables a provider utilizing a provider computing device, such as provider computing device 150 of FIG. 1, to submit a service to the electronic services marketplace 100. The user interface 200 may be generated by the marketplace server 112 of the electronic services marketplace 100 and presented on the provider computing device 150 by an application, such as a browser application, on the provider computing device 150. In this illustrative example, the submitted service corresponds to a service image implementing a software application on a hosted computing environment. The user interface 300 contains a title reference 202 to the electronic services marketplace 100, i.e., the "Hosted Web Services Catalog," as well as a salutation 204 to the provider currently visiting the electronic service image marketplace 100. In the illustrated example, the provider is identified as "Paul Provider." The user interface 200 further contains a navigation panel 210, which directs the provider to various other features offered by the electronic service image marketplace 100. Illustratively, units of text within the navigation panel 210 may correspond to interactive links, which modify or change the user interface when selected. In the current example, Paul Provider, has selected link 212, "Provide a New Service." Based on this selection, the marketplace server 112 has returned the content for user interface 200.

Through the user interface 200 the provider may submit information associated with a service (e.g., contained within a computer-executable service image) to the electronic service image marketplace 100. The provider, utilizing a provider computing device 150 may submit, via input box 222, an identifier of the service image to be used by the electronic services marketplace 100. This may be the name displayed to customers of the electronic services marketplace 100 when they view, browse, or search the electronic services marketplace 100. The provider may submit additional information, such as a file location (e.g., a file name or address), and pricing information via inputs 224-230. Input box 224 allows the provider to specify the device image that is to be submitted, and that may thereafter be hosted by a hosted computing environment on behalf of a customer. In the illustrated example, the service image location is a location on the provider computing device 150, as is displayed in FIG. 2. In other embodiments, the service image file may be located on another computing device, such as a computing device within a provider hosted computing environment 152, or a computing device within the marketplace hosted computing environment 120 associated with the electronic services marketplace 100.

In the illustrated example, input boxes 226-230 enable a provider to specify pricing information associated with acquiring a license to the submitted service image. For example, input box 226 enables the provider to specify a pricing structure associated with a service image such as a pricing structure requiring a subscription rate, an hourly usage fee, or other fee arrangements. Examples of additional pricing structures are discussed in more detail in the '227 Application.

In addition, a provider may further specify one or more descriptors to be associated with a provided service. Specifically, input box 232 may enable a provider to specify a first descriptor for a service, while link 233 may enable additional input boxes to be shown (e.g., to enable input of additional descriptors). As described in more detail below, each descriptor may be utilized to track usage of the provided service on hosted computing environments. In one embodiment, the provided service image may be modified by the electronic services marketplace 100 to include an indication of the descriptor. In another embodiment, the descriptor may be associated with the service without requiring modification of the service image, such as by storing the association within the electronic catalog 116.

Illustratively, a descriptor may include any combination of characters or symbols that may be used to uniquely identify or describe a service or collection of services. For example, in FIG. 2, a descriptor of "PDBV1" is shown, which may indicate the descriptor corresponds to "Paul's Database Version 1." In one embodiment, descriptors entered into the interface 200 may be checked against all known current descriptors, to ensure that each descriptor unique. For example, where another provider of the electronic services marketplace 100 had already used to descriptor "PDBV1," the user interface 200 may inform Paul Provider that another descriptor must be used. This may ensure that descriptors are associated only with the intended services, and that unauthorized users may not associate a given descriptor with unintended services. In another embodiment, each descriptor may be modified by the electronic services marketplace 100 to ensure uniqueness of descriptors between providers. For example, the descriptor entered in input 232 may be modified by the electronic services marketplace 100 to include the user name of the current provider (e.g., "Paul Provider—PDBV1"). In this manner, uniqueness of descriptors would not be required between providers. Further, the electronic services marketplace 100 may be configured to remove user names prior to reporting descriptors to providers, such that the provider is unaware of the modification. Though prepending of user names is described herein, one skilled in the art will appreciate that descriptors may be modified with any unique information, such as a provider identification number. Further, one skilled in the art will appreciate that supplementation of descriptors with unique information is not limited to prepending, but may include appendation or other association.

While one illustrative interface is described above for associating descriptors to services, additional or alternative interfaces or mechanisms may be utilized in order to create such an association. For example, in some instances, providers may be enabled to modify service images directly to include one or more desired descriptors. In other instances, the electronic services marketplace 100 may provide an API, command line interface, or alternative interface through which authorized parties may create or modify descriptors of a service. Any such interface, including the user interface 200 of FIG. 2, may utilize a variety of authentication mechanisms generally known within the art to ensure that modification of descriptors is executed only by authorized parties. For example, in one embodiment, public/private key encryption may be utilized, such that each descriptor must be signed by a private key known only to the provider.

Moreover, though descriptors are discussed above with respect to a single service, in some embodiments, multiple services may be associated with a single descriptor. For example, where multiple versions of "Paul's Database" service are provided, each version may be associated with a descriptor "PDB" exclusively or in addition to a version specific descriptor. In this manner, a provider may be enabled to gather usage information across a range or category of services. Similarly, multiple services provided by a provider may be associated with a given descriptor, such that information on all services provided by the provider may be obtained based on the descriptor. Still further, in some instances individual descriptors may be assigned to only specific instances of a service. For example, each instance of a service associated with a specific customer may be given a specific descriptor, such that instances of the service associated with the customer may be monitored independent of instances of the service associated with other customers. In some instances, the electronic services marketplace 100 may be configured to modify descriptors to differentiate between customers. For example, the electronic services marketplace 100 may prepend or append a descriptor with a customer identifier or other identification information. Accordingly, descriptors may be associated with one or many services or with any subset of services.

After all information has been input by a provider, submission may be completed by selecting the input control 234. Accordingly, the provider may activate the input control 234 to cause the provider computing device 150 to transmit the service or information related to the service the electronic services marketplace 100. Thereafter, a customer can submit a query for services available from the electronic services marketplace 100 and use a user interface to display information related to different services of interest. The customer can purchase and/or acquire the services available from the electronic services marketplace 100, as described in greater detail in the '227 application.

Figure 3:
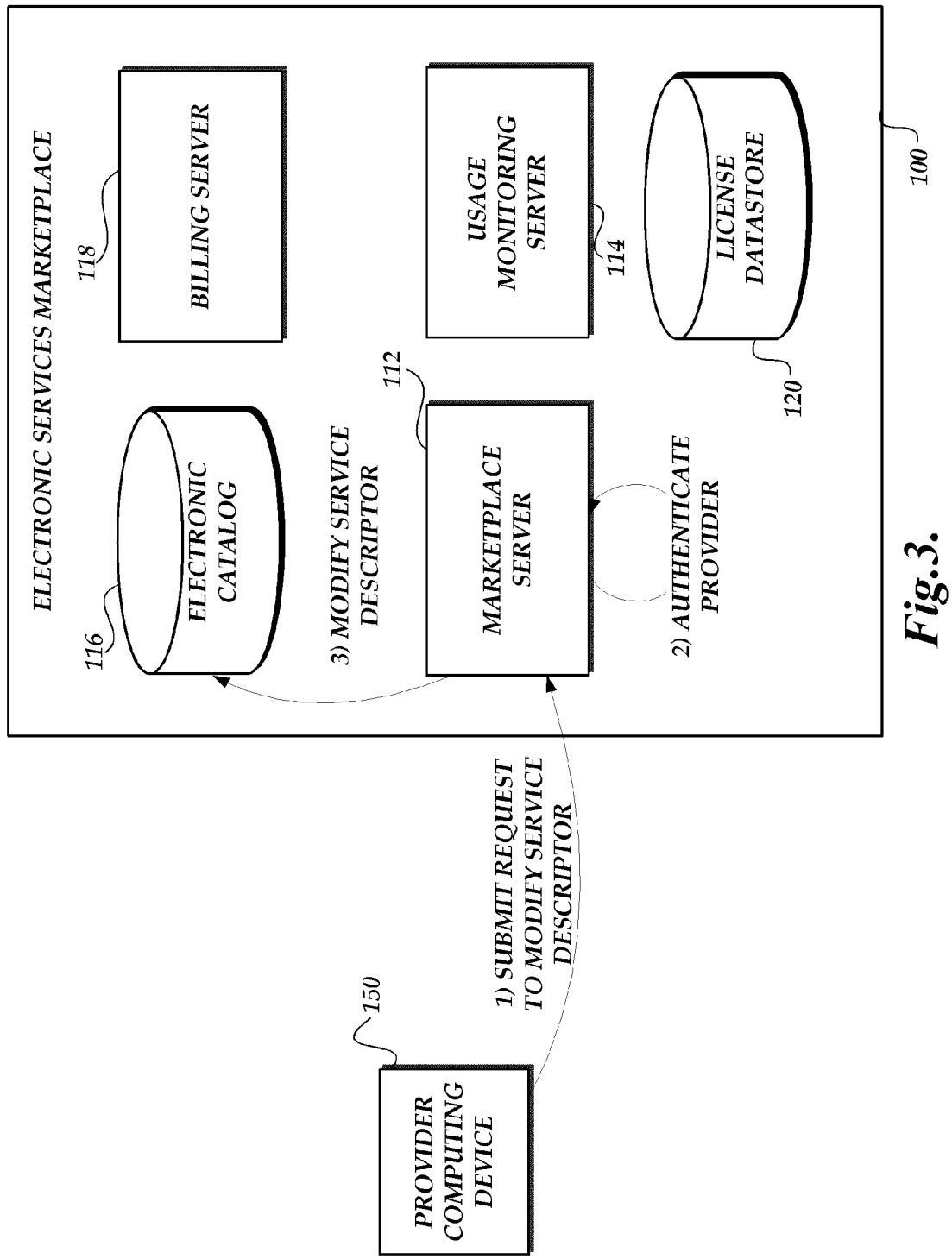
FIG. 3 is a block diagram depicting a provider computing device modifying service information for a service made available in the services marketplace of FIG. 1, including a service descriptor.

With reference to FIG. 3, an illustrative interaction for enabling a provider computing device 150 to submit a request to add or modify one or more service descriptors associated with a service made available on the electronic services marketplace 100 will be described. As depicted in FIG. 3, the provider computing device 150 may, at (1), submit a request to modify a service descriptor associated with a service. In one embodiment, such a request may be made through a graphical user interface, such as the user interface 200 of FIG. 2 or other graphical user interface provided by the electronic services marketplace 100. In another embodiment, such a request may be made through an alternative interface, such as an API.

The request may be received by the electronic services marketplace 100 (e.g., via the marketplace server 112). Thereafter, the marketplace server 112 (or other component of the electronic services marketplace 100) may authenticate the request, to ensure that the provider computing device 150 has authorization to modify descriptors of the service. In one embodiment, authentication may rely in whole or in part on a public/private key encryption pair, such as those generated in connection with the GPG, PGP, SSL, TLS, or SSH protocols. In brief, a provider may be provided with a unique private key, which may be used to sign requests to modify descriptors. Thereafter, the marketplace server 112 may utilize a corresponding public key to decrypt a portion of the request, and therefore to authenticate the request. Public/private key encryption algorithms and schemes are generally known within the art, and therefore will not be discussed in detail herein.

Though public/private key encryption is discussed herein, the marketplace server 112 may utilize any number of known authentication techniques to determine that the provider computing device 150 is authorized to provide or modify a descriptor for a service. For example the marketplace server 112 may require that the provider computing device 150 provide a password or other secret phrase along with a request to modify a descriptor. One skilled in the art will recognize a variety of authentication techniques may be used to authenticate computing devices.

Subsequent to authentication of the provider computing device 150, the marketplace server 112 may interact with the electronic catalog 116 to modify a descriptor associated with the service. In one embodiment, the marketplace server 112 may modify computer-executable instructions corresponding to a service image to include the descriptor, such that computer-executable instructions of each instance provisioned based on the service image will include the descriptor. In another embodiment, the marketplace server 112 may modify computer-executable instructions associated with one or more instances of the service previously or currently implemented on the hosted computing environment to include an indication of the descriptor (with or without modifying the service image directly). In yet another embodiment, the marketplace server 112 may modify metadata or other information regarding the service to indicate the updated descriptor. In still more embodiments, where the service is implemented on computing devices via an installation file or script, the marketplace server 112 may modify the installation file or script to correctly identify the descriptor, such that installation of the service within a virtual data store causes computer-executable instructions within the data store to include an indication of the descriptor. Thereafter, any instance of the service instantiated within a hosted computing environment would correspond to computer-executable instructions including an indication of the modified descriptor. Further, the electronic services marketplace 100 may therefore use the modified descriptor to generate usage data regarding instances of the service, such as to enforce licensing agreements associated with the service.

Figure 4:
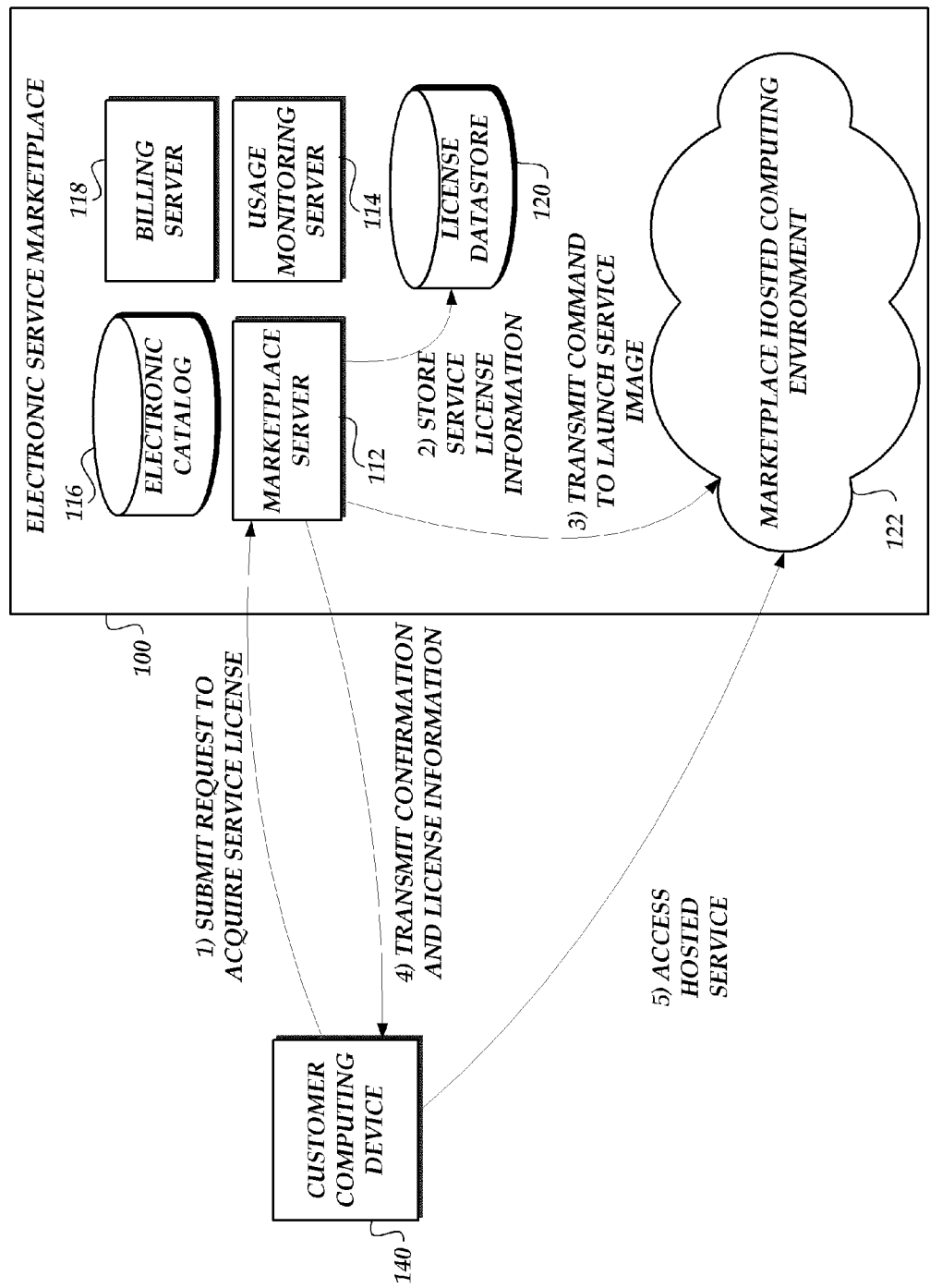
FIG. 4 is a block diagram depicting the acquisition of a service license by a customer, storage of information relating to the service license, and launching of the acquired service on a hosted computing environment associated with the services marketplace of FIG. 1.

FIG. 4 is a block diagram depicting the acquisition of a license corresponding to a service by the customer and launching of the service on a hosted computing environment associated with the electronic services marketplace 100. In this regard, a customer utilizing a customer computing device 140 may, at (1), request to acquire a license corresponding to a service that the customer has found and selected from the electronic services marketplace 100. The request may, for example, be processed by the marketplace server 112 of the electronic services marketplace 100. After receiving the request to acquire a license, the marketplace server 112 may, at (2), store information corresponding to the customer's acquisition of the license in the license datastore 120. Illustratively, the license information within the license datastore 120 may be inspecting prior to launching an instance of the service on a hosted computing environment. In some embodiments, such inspection may be carried out by the marketplace server 112. In other embodiments, a hosted computing environment, such as the marketplace hosted computing environment 122, may be configured to verify that license information exists within the license datastore 120 before launching a service. As will be described in more detail below, in some embodiments, license information within the license data store 120 may be associated with specific descriptors of a service in order to verify customer compliance with the license information. The customer-submitted request to acquire a service license may further correspond to a request to cause the service to be executed on the marketplace hosted computing environment 122. As such, at (3), the marketplace server 112 may transmit a command which causes the launch of the service image on a hosted computing environment. For the purposes of illustration, this command is depicted as transmitted from the marketplace server 112. As will be appreciated by one skilled in the art, one or more intermediary servers in the electronic services marketplace 100 may be required in order to transmit the command to launch the service image. In some embodiments, the marketplace server 112 may interact with the electronic catalog 116 to acquire service image implementing the selected service before transmitted the command to launch. In these embodiments, the marketplace server 112 may further transmit such a service image to the selected hosted computing environment.

With respect to FIG. 4, the selected hosted computing environment is the marketplace hosted computing environment 120. However, as will be appreciated by one skilled in the art, the selected hosted computing environment may in some embodiments correspond to a provider computing environment, such as a provider computing environment 152 of FIG. 1. Launching of services within a hosted computing environment will be discussed in more detail below with respect to FIGS. 5A and 5B.

Subsequent to launching the customer selected service, the marketplace server 112 may, at (4) transmit a confirmation to the customer computing device 140, as well as information regarding the hosted service. Such information may include the location of the computing device implementing the service and any access information required to access the computing device hosting the service. Subsequent to receiving confirmation of launch and relevant hosting information, the customer computing device 140 may, at (5) access the computing device hosting the service.

With reference to FIGS. 5A and 5B, illustrative interactions will be described for monitoring use of a service executing on a marketplace hosted computing environment 120 based on descriptors. Though described herein with reference to a marketplace hosted computing environment 120, one skilled in the art will appreciate that usage of services within a provider hosted computing environment 152 may also be monitored. Though shown in two figures, the illustrative interactions may occur in conjunction, and numbering is therefore maintained between the figures. Further, one skilled in the art will appreciate that the interactions may represent activities at distinct points in time, with or without intervening interactions (e.g., customer use of services).

As depicted in FIG. 5A, at (1), a service, such as the Paul's Database service of FIG. 2, may be launched within the marketplace hosted computing environment 120. In one embodiment, launching of a service may include instantiation of a virtual computing device executing computer-executable instructions contained within an image corresponding to the service. In a second embodiment, launching of a service may include executing computer-executable instructions within an existing computing device (virtual or physical). For example, launching of a service may include launching an application or program implementing the service, or may include launching an installation program corresponding to the service.

Subsequent to or during launching of the service, the marketplace hosted computing environment 120 may transmit an indication to the usage monitoring server 114 that the service has been instantiated. In one embodiment, such an indication may be generated by a virtual computing device implementing the service. In another embodiment, the indication may be generated by a physical computing device hosting such a virtual computing device. In still more embodiments, the indication may be generated by a distinct computing device within the marketplace hosted computing environment 120, such as a computing device configured to manage instantiation of services within the marketplace hosted computing environment 120.

The transmitted indication may include information corresponding to the service, such as any descriptors associated with the service. The transmitted indication may further include identifying aspects of the service or devices implementing the service. For example, the transmitted indication may include a volume identifier associated with a virtual data store from which the service has been implemented and/or an identifier of a virtual computing device implementing the service. Further information may be included within the service launch information, such as a time or location of launch. In addition, in some embodiments, the usage monitoring server 114 may be configured to modify or supplement the received service launch information, such as by including a time of reception of the service launch information. Thereafter, the service launch information may be stored within the service image data store 502. Accordingly, by inspection of information within the service usage data store 502, the usage monitoring server 114 may determine usage data associated with the service, such as a number of instances of the service currently being implemented, timing information associated with the service, or geographic information associated with the service.

Though illustrative interactions are described with respect to FIG. 5A, additional or alternative interactions further be undertaken by the marketplace hosted computing environment 120, the usage monitoring server, 114, or both, without departing from the scope of the present disclosure. For example, though not shown in FIG. 5A, the marketplace hosted computing environment 120 may, in some embodiments, be configured to update and/or verify a license information associated with service prior to launching an instance of the service. For example, the marketplace hosted computing environment 120 may, prior to (1), request an indication from the usage monitoring server 114 that an additional instance of the service would comply with currently licensing agreements. The marketplace hosted computing environment 120 may then make a determination as to whether to launch the service based on the response of the usage monitoring server 114. Further, in some embodiments, the usage monitoring server 114 may be configured to utilize launch information received from the marketplace hosted computing environment 120 to ensure compliance with a service license. For example, assume that a customer is associated with a fixed number of licenses of a given service, such that each instance of the service requires a single license. In such instances, the usage monitoring server 114 may utilize received launch information to associate a specific instance of a service with an individual license of the service. Illustratively, the usage monitoring server 114 may maintain an association between an individual license and a descriptor associated with a service instance. Such associations may thereafter be used to verify the availability of licenses for a service. For example, where an association to a descriptor exists for each license available to a customer, the usage monitoring server 114 may determine that no additional instances of the service may be launched. One skilled in the art will appreciate that additional interactions may be implemented in conjunction with those shown in FIG. 5A without departing from the scope of the present disclosure.

Thereafter, at (3), the marketplace hosted computing environment 120 may halt the executed service. Illustratively, halting of the service may be undertaken in response to a client command to halt the service, or in response to detection that execution of the service is no longer necessary (e.g., according to a defined set of rules for service execution). In one embodiment, halting of a service may correspond to halting a virtual computing device implementing the service. In another embodiment, halting of a service may correspond to halting execution of an application or other computer-executable instructions within a computing device. Subsequent to or during halting of the service, the marketplace hosted computing environment 120 may transmit an indication to the usage monitoring server 114 that the service has been halted. In one embodiment, such an indication may be generated by a virtual computing device implementing the service. In another embodiment, the indication may be generated by a physical computing device hosting such a virtual computing device. In still more embodiments, the indication may be generated by a distinct computing device within the marketplace hosted computing environment 120, such as a computing device configured to manage instantiation of services within the marketplace hosted computing environment 120.

Similarly to as described above, the transmitted indication may include information corresponding to the service, such as any descriptors associated with the service. The transmitted indication may further include identifying aspects of the service or devices implementing the service. For example, the transmitted indication may include a volume identifier associated with a virtual data store from which the service was implemented and/or an identifier of a virtual computing device implementing the service. Further information may be included within the service halt information, such as a time or location of halting the service. In addition, in some embodiments, the usage monitoring server 114 may be configured to modify or supplement the received service launch information, such as by including a time of reception of the service halt information. Thereafter, the service launch information may be stored within the service image data store 502.

Figure 6:
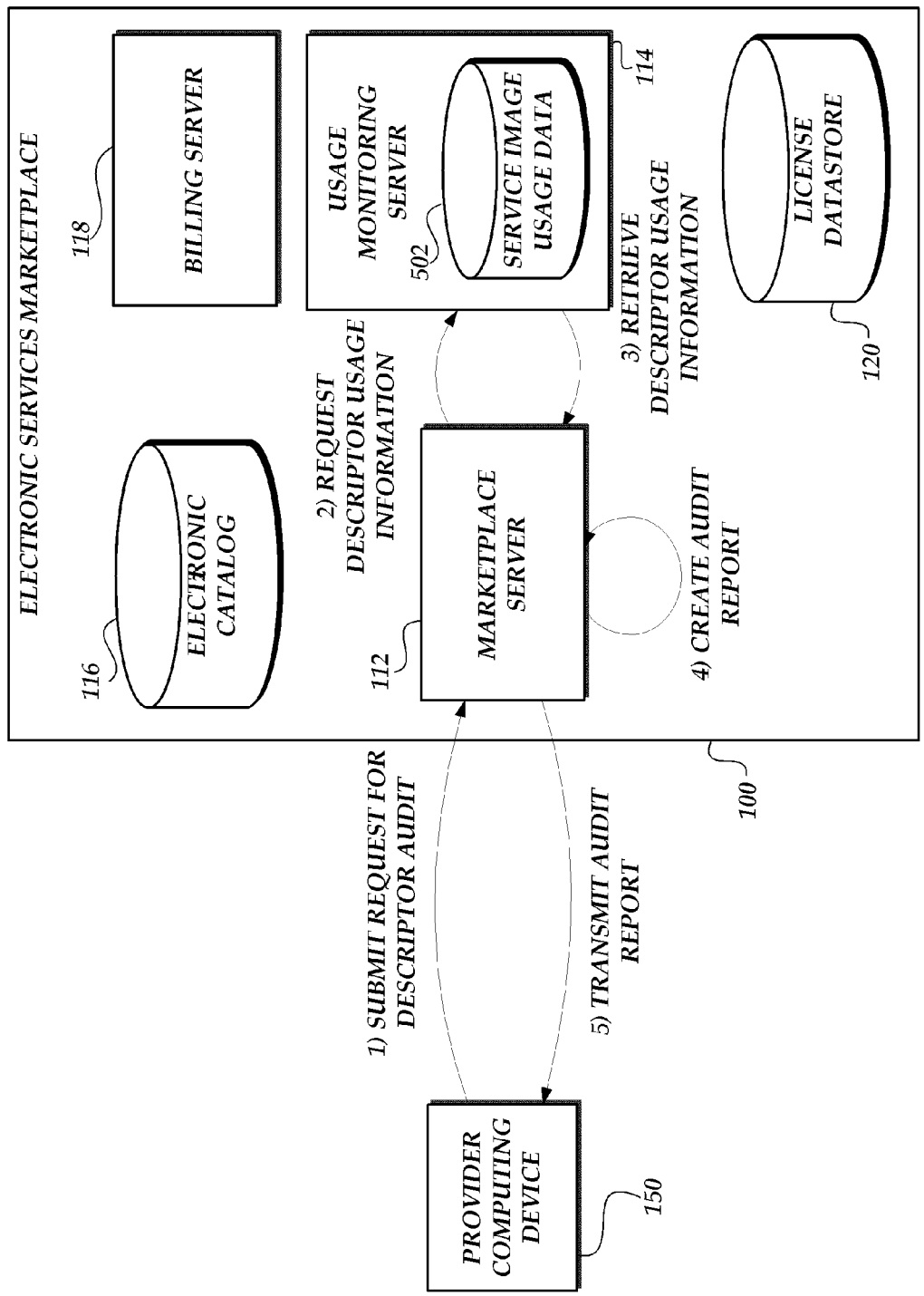
FIG. 6 is a schematic block diagram depicting a provider computing device requesting an audit of usage information of services obtained from the services marketplace of FIG. 1 and including a specified descriptor.

FIG. 6 is a schematic block diagram depicting a provider computing device, such as provider computing device 150 of FIG. 1, requesting a service audit regarding a descriptor. As described above, descriptors may be associated with any single service, or any collection of services. Accordingly, by requesting information regarding a specific descriptor, usage information regarding any number or combination of services may be obtained. As depicted in FIG. 6, the provider, utilizing the provider computing device 150, submits a request for a descriptor audit to the marketplace server 112 at (1). As an illustrative example, the provider utilizing provider computing device 150 may correspond to Paul Provider. The submitted request for a descriptor audit may correspond to an audit of usage of any service associated with the "PDBV1" descriptor (which corresponds to the "Paul's Database" service, as discussed above). This illustrative example is intended to describe a provider requesting a descriptor audit containing authorized information, and is not intended to convey that a provider may obtain sensitive customer information without authorization. In some embodiments, a customer may specify which (if any) customer information may be included within an audit report. Further, the electronic services marketplace 100 may itself restrict the type or amount of information that may be included in an audit report. In some embodiments, the electronic services marketplace 100 may set default levels of information that may be disclosed, and enable a customer to modify those default levels.

Subsequent to receiving a request for a descriptor audit, the marketplace server 112, at (2), requests descriptor usage information from the usage monitoring server 114. The service usage information illustratively corresponds to usage information of any service associated with the "PDBV1" descriptor. For example, the usage information may include a number, type, and location of computing devices currently implementing services associated with the descriptor, as well as additional information regarding such services. Such information may include, but is not limited to, identification of customers utilizing such services, run times of such services, and licensing information regarding such services. The usage monitoring server 114, at (3), returns the relevant service image usage information to the marketplace server 112.

Though not shown, the electronic service image marketplace 100 may optionally request permission from customers implementing services to release the relevant service usage information or the descriptor audit report. Such a request for permission may be transmitted to customers at any point prior to transmitting the audit report to the requesting provider. Permission to disclose an audit report may be required, for example, where private or sensitive information of customers would be disclosed by the report. In some examples, usage conditions associated with a service image may specify whether the electronic service image marketplace 100 requests permission from a customer prior to disclosing an audit report. One skilled in the art will appreciate that a customer may deny any audit report to a provider, or may deny only access to specific information. In the current example, C customers may allow Paul Provider to verify that each service instance is in compliance with the usage conditions associated with the services, but may not allow Paul Provider to receive information such as the number of instances which are being executed on behalf of each customer, or the number of aggregate hours during which those instances have been executed. In some embodiments, a customer's preferences for release of usage information may be pre-specified, such that the customer need not give permission to release usage information unless release of the information would exceed their pre-specified preference.

Subsequently, at (4) the marketplace server 112 may generate an audit report for the specified descriptor and customer based on the retrieved usage information. In one embodiment, the marketplace server 112 may determine whether each service associated with the retrieved usage information is in compliance with relevant licensing information. For example, the marketplace server 112 may determine that a specific customer is licensed to execute three simultaneous instances of services associated with the "PDBV1" descriptor, and is only executing two simultaneous instances. As such, the marketplace server 112 may generate an audit report reflecting that the customer is in compliance with usage conditions for the service. Alternatively, if the customer was not in compliance with the set forth usage conditions, the audit report would reflect this non-compliance. In some embodiments, as described above, license compliance may be determined based at least in part on associations between individual licenses for a service and descriptors associated with the service. Accordingly, in some such embodiments, the marketplace server 112 may be configured to determine compliance with a license agreement based on associations between a customer's individual licenses and one or more descriptors of a service.

As described above, if a customer has not given permission to disclose additional details of usage, the audit report may simply reflect a status of compliance or non-compliance. On the other hand, if the customer has allowed disclosure of additional information, or if disclosure is required by the agreed on usage conditions, the audit report may contain further details of the customers usage, such as the peak number of instances executed or the aggregate number of hours the service image has been executed. Further examples for determining compliance with usage information are described in more detail within U.S. patent application Ser. No. 13/406,348, entitled "Managing Transfer of Hosted Service Licenses" and filed Feb. 27, 2012, the entirety of which is hereby incorporated by reference.

Figure 7:
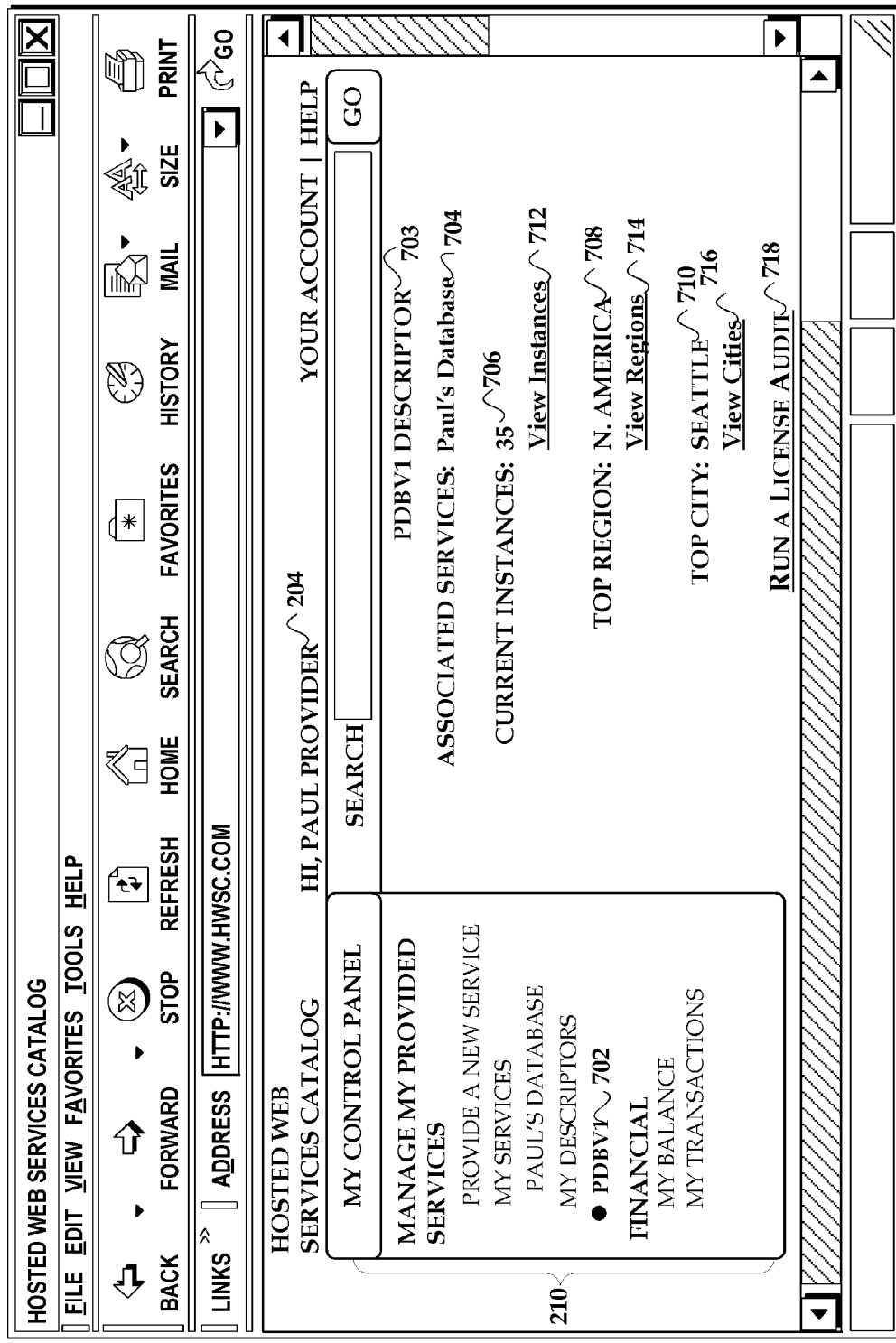
FIG. 7 depicts an illustrative user interface displayed on a provider computing device that presents usage information regarding one or more descriptors associated with services made available on the services marketplace of FIG. 1.

With reference to FIG. 7, an illustrative user interface 900 displayed on a customer computing device and detailing information regarding provided services is depicted. As shown in FIG. 7, the user interface 700 enables a provider to receive information regarding service images provided to the electronic services marketplace 100, i.e., the "Hosted Web Services Catalog". The current user of the "Hosted Web Services Catalog" is Paul Provider 204. As discussed above with respect to FIG. 2, Paul Provider has provided the service "Paul's Database" to the electronic services marketplace 100. Further, Paul Provider has attached a descriptor, "PDBV1" to the "Paul's Database" service. To reflect the addition of the descriptor, the navigation panel 210 now displays a link 702 under the heading "My Descriptors" which is selectable by a customer to view usage information of associated with each selectable descriptor link. The user interface 700 is reflective of Paul Provider's selection of link 702. Display features 703-710 depict information regarding the services associated with the "PDBV1" descriptor. For example, display feature 703 displays the descriptor itself. Display feature 704 reflects the one or more services associated with the descriptor. Display feature 706 reflects the number of instances of services associated with the descriptor that are currently running, while display feature 708 and display feature 710 reflect the region and city, respectively, in which a majority and/or plurality of those instances are located. Links 712-716 enable the customer to obtain further information regarding each item of information. Specifically, link 712 may be selectable to view information regarding individual instances of services associated with the PDBV1 descriptor that are currently implemented, link 714 may be selected to view regions in which services associated with the PDBV1 descriptor are located, and link 716 may be selected to view cities in which services associated with the PDBV1 descriptor are located. Further, the interface 700 may include a link 718 selectable to run a license audit for services associated with the PDBV1 descriptor, as is described in more detail above with respect to FIG. 6. Though illustrative examples of usage information corresponding to a descriptor as described herein, one skilled in the art will appreciate that any combination of usage information may be displayed within the user interface 700. Further, usage information may be made available through alternate interfaces, such as an API or command line interface. In some instances, usage information may be made available to parties other than providers, such as those authorized by providers. In other instances, usage information may be monitored or viewed by the electronic services marketplace 100 itself.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIGS. should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for monitoring interaction with services implemented in a hosted computing environment, the system comprising:
   a data store configured to store a plurality of service images, wherein each service image includes a set of computer-executable instructions that, when executed within the hosted computing environment, implements an instance of at least one associated service;
   a monitoring computing device in communication with the data store, the monitoring computing device including a processor configured to at least:
      receive, from a provider computing device distinct from the monitoring computing device and associated with a provider of a first service, a unique descriptor that identifies the first service;
      determine a service image associated with the first service;
      modify computer-executable instructions corresponding to the service image associated with the first service to include the unique descriptor so that each instance of the service image that is executed includes the unique descriptor;
      receive usage information for a plurality of instances implemented on the hosted computing environment, wherein at least a portion of the plurality of instances correspond to the service image;
      identify, from the plurality of instances, one or more instances that correspond to the service image based at least in part on detection of the unique descriptor within computer-executable instructions corresponding to each of the one or more instances; and
      transmit, to the provider computing device, the usage information for the one or more instances that correspond to the service image.

2. The system of claim 1, wherein the processor is further configured to at least determine that the usage information indicates compliance with a licensing agreement.

3. The system of claim 2, wherein the processor is further configured to at least determine that the usage information indicates compliance with a licensing agreement based at least in part on associations of individual licenses of the first service with the descriptor.

4. The system of claim 1, wherein the usage information indicates at least one of a location of the one or more instances that correspond to the service image, a number of instances for which the unique descriptor is detected, or a total time of implementation of the one or more instances that correspond to the service image.

5. The system of claim 1, wherein the usage information for the plurality of instances implemented on the hosted computing environment comprises, for each instance of the plurality of instances, an indication of instantiation of the instance.

6. The system of claim 5, wherein the indication of instantiation of the instance includes one or more unique descriptors within computer-executable instruction corresponding to the instance.

7. A computer-implemented method, as implemented by a monitoring computing device configured with specific executable instructions, for monitoring interaction with services implemented in a hosted computing environment, the computer-implemented method comprising:
  receiving a unique descriptor for a particular service;
  modifying computer-executable instructions associated with the particular service to include an indication of the unique descriptor so that each instance of the particular service that is implemented includes the unique descriptor;
  receiving usage information for a plurality of instances implemented on the hosted computing environment, wherein each instance of the plurality of instances is associated with computer-executable instructions, and wherein at least a portion of the plurality of instances are instances of the particular service and associated with computer-executable instructions modified to include the indication of the unique descriptor;
  identifying, based at least in part on the computer-executable instructions associated with each instance of the plurality of instances, at least one instance associated with computer-executable instructions modified to include the indication of the unique descriptor; and
  transmitting the usage information for the at least one instance to a receiving computing device.

8. The computer-implemented method of claim 7, wherein the unique descriptor is received from a provider of the particular service.

9. The computer-implemented method of claim 8, wherein the receiving computing device is a provider computing device associated with the provider.

10. The computer-implemented method of claim 7 further comprising authenticating a computing device from which the unique descriptor is received.

11. The computer-implemented method of claim 7 further comprising denying a request from an unauthorized party to associate a unique descriptor with the particular service.

12. The computer-implemented method of claim 7, wherein modifying the computer-executable instructions associated with the particular service to include an indication of the unique descriptor includes modifying a service image associated with the particular service to include an indication of the unique descriptor.

13. The computer-implemented method of claim 7, wherein modifying the computer-executable instructions associated with the particular service to include an indication of the unique descriptor includes modifying computer-executable instructions of one or more instances of the particular service to include an indication of the unique descriptor.

14. A non-transitory computer-readable medium containing computer-executable instructions for monitoring interaction with a service implemented in a hosted computing environment, the computer-executable instructions comprising:
  first instructions that, when executed by one or more processors, associate computer-executable instructions corresponding to a first service with a unique descriptor for the first service received from an authorized computing device so that each instance of the first service that is implemented includes the unique descriptor;
  second instructions that, when executed by one or more processors:
    process usage information corresponding to a plurality of service instances implemented on a hosted computing environment, wherein at least a portion of the plurality of service instances are instances of the first service and associated with the computer-executable instructions corresponding to the first service;
    identify, from the plurality of service instances implemented on the hosted computing environment, a service instance that is an instance of the first service, wherein the service instance is identified based at least in part on determining that the unique descriptor for the first service is associated with computer-executable instructions corresponding to the service instance; and
    transmit the usage information for the service instance to a receiving computing device.

15. The non-transitory computer-readable medium of claim 14, wherein the unique descriptor is received from a party authorized to modify unique descriptors for the first service.

16. The non-transitory computer-readable medium of claim 14, wherein the receiving computing device is a computing device associated with an operator of the hosted computing environment.

17. The non-transitory computer-readable medium of claim 14, wherein the receiving computing device is configured to determine that the usage information indicates compliance with a licensing agreement.

18. The non-transitory computer-readable medium of claim 14, wherein the usage information corresponding to the plurality of service instances implemented on a hosted computing environment includes, for each service instance of the plurality of service instances, information regarding a unique descriptor for a service of which the service instance is an instance.

19. A system for monitoring interaction with services implemented in a hosted computing environment, the system comprising:
  one or more processors; and
  a memory storing computer-executable instructions, which when executed by the one or more processors, cause the one or more processors to at least:
    associate a first set of computer-executable instructions corresponding to a service with a received unique descriptor for the service so that each instance of the service that is implemented includes the unique descriptor;
    process usage information corresponding to a plurality of service instances implemented on a hosted computing environment, wherein at least a portion of the plurality of service instances are instances of the service;
    identify, from the plurality of service instances implemented on the hosted computing environment, a service instance that is an instance of the service, wherein the service instance is identified based at least in part on determining that the received unique descriptor for the service is associated with computer-executable instructions corresponding to the service instance; and
    transmit the usage information for the service instance to a receiving computing device.

20. The system of claim 19, wherein the one or more processors are further configured to at least authenticate the received unique descriptor.

21. The system of claim 20, wherein the one or more processors are further configured to at least authenticate the received unique descriptor based at least in part on authentication of a computing device from which the received unique descriptor was received.

22. The system of claim 20, wherein the one or more processors are further configured to at least authenticate the received unique descriptor based at least in part on public key encryption.

23. The system of claim 22, wherein the received unique descriptor is signed with a private key.

24. The system of claim 19, wherein the one or more processors are further configured to at least:
receive a request to associate the received unique descriptor with an additional service; and
associate one or more sets of computer-executable instructions corresponding to the additional service with the received unique descriptor.

25. The system of claim 19, wherein the one or more processors are further configured to at least associate the one or more sets of computer-executable instructions corresponding to the service with the received unique descriptor based at least in part on modification of the one or more sets of computer-executable instructions.

* * * * *